D. F. OLIVER.
COMBINED CUSHIONING AND REBOUND CHECKING DEVICE FOR VEHICLES.
APPLICATION FILED DEC. 17, 1912. RENEWED MAR. 8, 1915.
1,152,752.
Patented Sept. 7, 1915.
2 SHEETS—SHEET 1.
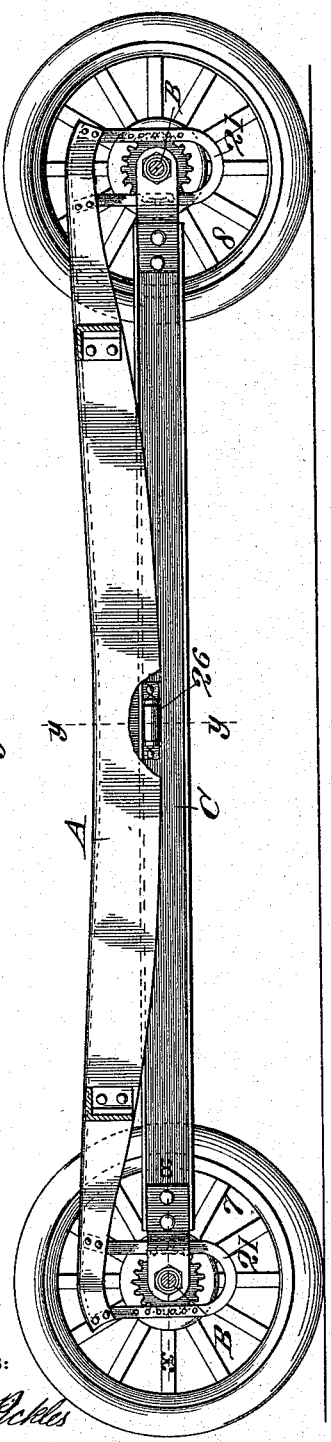
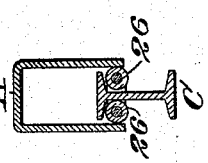
WITNESSES:
Charles Pickles
R. S. Berry
INVENTOR
Doctor F. Oliver
BY G. H. Strong
ATTORNEY

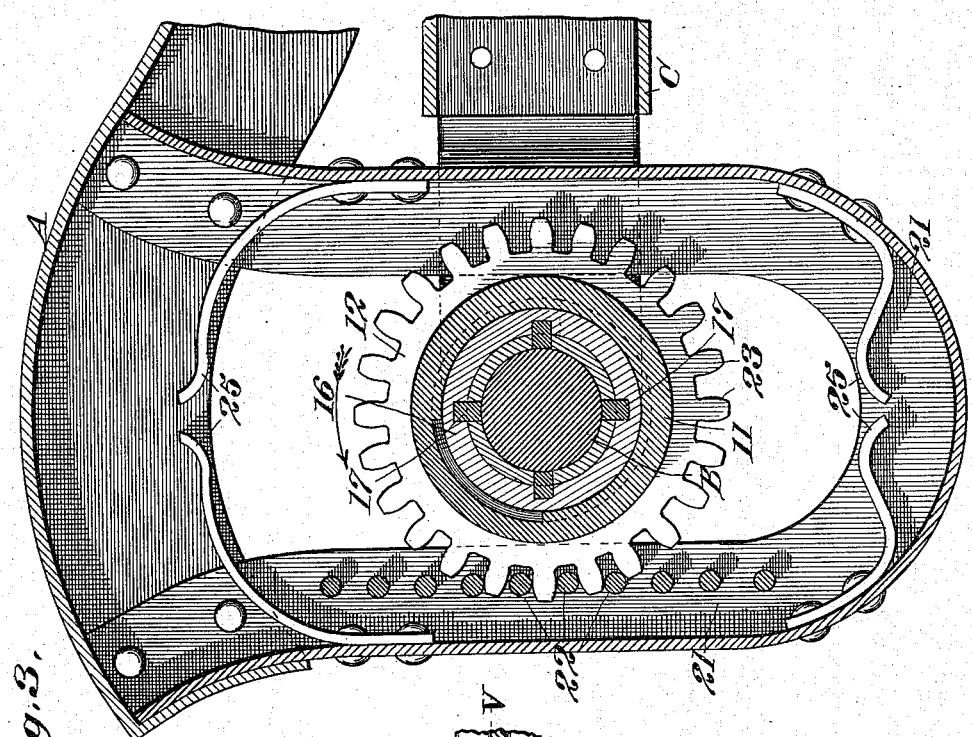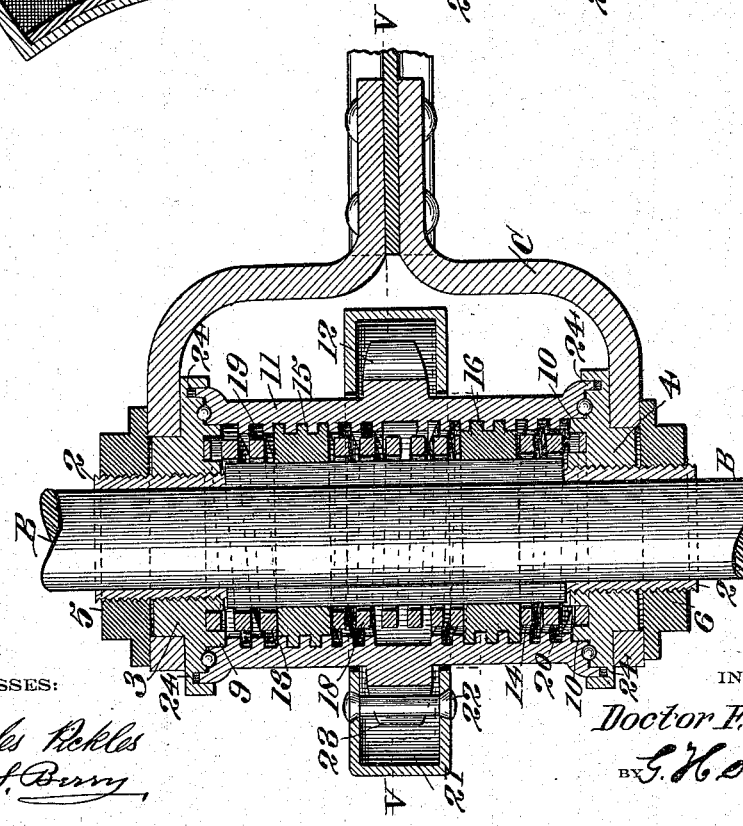

UNITED STATES PATENT OFFICE.

DOCTOR FRANKLIN OLIVER, OF SAN FRANCISCO, CALIFORNIA.

COMBINED CUSHIONING AND REBOUND-CHECKING DEVICE FOR VEHICLES.

1,152,752.  Specification of Letters Patent.  Patented Sept. 7, 1915.

Application filed December 17, 1912, Serial No. 737,228. Renewed March 8, 1915. Serial No. 12,914.

*To all whom it may concern:*

Be it known that I, DOCTOR FRANKLIN OLIVER, a citizen of the United States, residing in the city and county of San Francisco and State of California, have invented new and useful Improvements in Combined Cushioning and Rebound-Checking Devices for Vehicles, of which the following is a specification.

This invention relates to a combined cushioning and rebound checking device for vehicles.

The object of this invention is to provide a simple, substantial and practical cushioning device for vehicles, which is especially constructed to take the place of the elliptical or leaf spring mountings now most commonly used.

Another object of this invention is to provide a device of this kind which is compact and selfcontained so as to reduce the space formerly required to a minimum.

A further object of the invention is to provide means operable in conjunction with the cushioning device for checking or deadening the rebound of the chassis body.

The invention consists of the parts and the construction and combination of parts as hereinafter more fully described and claimed, having reference to the accompanying drawings, in which—

Figure 1 is a side elevation showing the application of the device. Fig. 2 is a section on the line X—X of Fig. 1. Fig. 3 is a section on line V—V of Fig. 2. Fig. 4 is a section on the line Y—Y of Fig. 1.

Referring to the drawings A indicates the vehicle frame or chassis to which the running gear of the vehicle is secured. The cushioning and rebound checking device interposed between the main supporting axles B of the vehicle constitutes the invention in this application.

Referring particularly to Figs. 2 and 3, the device consists of a sleeve 2 in which the axle B is suitably supported. The outer ends of the sleeve are shown as threaded to receive a pair of caps 3 and 4 between which and a pair of lock nuts 5 and 6 a secondary running frame C is secured, being provided for the purpose of insuring an equal distance between the wheels 7 and 8 of the vehicle. The caps 3 and 4 are provided with annular shoulders 9 and 10, on which is journaled an annular sleeve 11 on which is formed or secured a gear wheel 12. The inside of the sleeve 11 is shown as provided with a set of right and left hand square threads 13 and 14, with which a pair of nuts 15 and 16 are adapted to register; the nuts being secured by keys 17 to the sleeve 2, and being prevented from turning by reason of the fact that the sleeve is locked or secured by the nuts 5 and 6. The nuts 15 and 16, while being prevented from revolving, are free to slide in either direction on the keys 17. Between the nuts 15 and 16 is mounted a coil spring 18, while between the outer caps 3 and 4, and each individual nut, is positioned a pair of coil springs 19 and 20.

Extending from each end of the main frame A of the vehicle is a U-shaped channel yoke 21 which is provided on one side with a suitable number of pins 22, so positioned as to be engageable with the teeth 23 of the gear 12.

While I am here describing the construction and operation of only one wheel, it will be understood that each wheel of the vehicle is similarly mounted and connected with the main frame.

The operation of the device will be as follows: Supposing that one of the wheels of the vehicle should strike an obstruction or depression in the roadway which would suddenly throw the weight of the frame against the particular wheel, the pressure exerted would be transmitted through the pins 22 to the gear 12 which would cause the gear 12 to revolve in the direction of the arrow *a*. The revolution of the gear would be transmitted to the sleeve 11, which is provided on its inner surface with the right and left hand threads 13 and 14. The turning movement of the sleeve and threads would feed the nuts 15 and 16 toward each other, thus compressing the coil springs 18, which would check or resist the downward movement of the vehicle frame at this point. Similarly the rebound or upward movement of the vehicle frame or chassis would be transmitted through the pins 22 to revolve the gear in the opposite direction and correspondingly feed the nuts 15 and 16 outwardly and compress the individual springs 19 and 20 against the caps 3 and 4. The resistance of the individual springs 19 and 20 would thus check the rebound of the vehicle body.

For the purpose of providing a free turning movement of the sleeve 11 on which the gear 12 is mounted, I have mounted ballbearings between the ends of the sleeve 11 and the caps 3 and 4; and for the purpose of preventing dust or grit from entering the ball races and the internal threaded portion on the sleeve 11 which is filled with a suitable lubricant at all times, I have provided an annular packing groove 24 in each cap.

For the purpose of providing against unusual and severe shocks to which the vehicle may be subjected, I have provided a pair of secondary springs 25 both in the upper and lower portions of the frame 21, with which the gear 12 would contact and the movement be resisted.

By providing a selfcontained and substantial device as here shown to check and cushion the movements or vibrations of the chassis, it can be seen that I have reduced the space formerly required for elliptical or leaf springs to a minimum, and that the use of radius rods can be entirely eliminated, as the chassis is held in position with relation to the running wheels of the vehicle by the downwardly extending frames 21 and the running frames C. It can also be seen that any side thrust exerted by the chassis with relation to the running frame would be absorbed partly by the channel shaped construction of the chassis frame A, as shown in Fig. 4. The running frame would in this instance preferably be provided with guide rollers as indicated at 26 for the purpose of relieving the side thrust between the chassis and running frame.

The device as here shown is neat in appearance, substantial in construction, and efficient and reliable in action, and takes less space than the spring mountings formerly used. The materials and finish of the several parts of the mechanism are such as experience and judgment of the manufacturer my dictate.

I wish it understood that various changes in form, proportion and minor details of construction may be resorted to within the scope of the appended claims, and that I do not wish to limit myself to the specific design and construction here shown.

Having thus described my invention, what I claim and desire to secure by Letters Patent, is—

1. A cushioning device for vehicles consisting of a fixed sleeve surrounding the vehicle axle and having exterior, longitudinal keys, nuts slidable upon the keys, compressible springs between the nuts, an exterior, loosely turnable sleeve having interior right and left screw threads engaging corresponding threads of the nuts, an exterior pinion, and means connected with the vehicle frame and engaging the pinion to rotate the sleeve and advance the nuts in unison with the movements of the vehicle body.

2. The combination with a vehicle body and its axle, of a plurality of horizontally compressible springs surrounding the axle and slidable interposed nuts, a revoluble sleeve with interior right and left threads engaging the nuts, an exterior pinion, and a vertically movable rack carried by the vehicle body and engaging the teeth of the pinion.

3. The combination with a vehicle body and its axle, of a plurality of horizontally compressible springs surrounding the axle and slidable interposed nuts, a revoluble sleeve with interior right and left threads engaging the nuts, an exterior pinion, a vertically movable rack carried by the vehicle body and engaging the teeth of the pinion, and supplemental cushion springs carried by the rack above and below the pinion.

4. A cushioning device for vehicle frames, comprising a sleeve secured stationary with relation to the vehicle axle, a pair of nuts slidably mounted on keys secured in said sleeve, a coil spring interposed between said nuts, a cylindrical casing concentrically mounted with relation to the sleeve, nuts and spring, right and left hand threads formed on the inner surface of the casing with which the nuts engage, means for revolving said casing, and means for transmitting the vertical movements of the frame with relation to the axle to actuate said revolving means.

5. A combined cushioning and rebound checking device for vehicle frames, comprising a sleeve secured stationary with relation to the vehicle axle, a pair of nuts slidably mounted on keys secured in the sleeve, a cylindrical casing concentrically mounted with relation to the sleeve and nuts, bearing members secured to the sleeve upon which the casing is revolubly mounted, right and left hand threaded sections formed on the inner surface of the casing with which the nuts engage, means for transmitting both the downward and upward vertical movements of the frame with relation to the vehicle axle to revolve the casing so as to feed the nuts in opposite directions, and means interposed between the nuts and the bearing members to resist the sliding movements of the nuts with relation to each other.

6. A combined cushioning and rebound checking device for vehicle frames, comprising a sleeve secured stationary with relation to the vehicle axle, a pair of nuts slidably mounted on keys secured in the sleeve, a cylindrical casing concentrically mounted with relation to the sleeve and nuts, bearing members secured to the sleeve upon which the casing is revolubly mounted, right and left hand threaded sections formed on the inner surface of the casing with which the nuts engage, a revolving means secured on the outside of the casing, means for transmitting the vertical movements of the vehicle frame with relation to the vehicle axle to revolve said revolving means and casing, so as to feed the nuts in opposite directions, means interposed between the nuts and bearing members to resist the sliding movements of the nuts with relation to each other, and a secondary means mounted outside of the casing positioned so as to resist any excessive movements between the casing and vehicle frame.

7. A combined cushion and shock absorber for vehicles, including horizontally compressible springs surrounding the axles, right and left hand nuts between which the springs are located, an interiorly threaded, revoluble sleeve engaging the exterior of the nuts and having a gear pinion, and a toothed rack fixed to the vehicle frame with its teeth engaging those of the pinion.

8. A combined cushion and shock absorber for vehicles including horizontally compressible springs surrounding the axles, slidable nuts between which the springs are located, an interiorly right and left threaded sleeve engaging the exterior of the nuts and having an exterior gear pinion, a toothed rack fixed to the vehicle frame with its teeth engaging those of the pinion, and terminal supplemental cushion springs carried by the rack.

In testimony whereof I have hereunto set my hand in the presence of two subscribing witnesses.

DOCTOR FRANKLIN OLIVER.

Witnesses:
JOHN H. HERRING,
W. W. HEALEY.

Copies of this patent may be obtained for five cents each, by addressing the "Commissioner of Patents, Washington, D. C."